United States Patent
Vidmore

(10) Patent No.: US 6,855,039 B2
(45) Date of Patent: Feb. 15, 2005

(54) STABILIZING COLLAR FOR A CONCRETE SAW BLADE

(76) Inventor: David L. Vidmore, 5150 E. La Palma #107, Anaheim, CA (US) 92807

(*) Notice: Subject to any disclaimer, the term of this patent is extended or adjusted under 35 U.S.C. 154(b) by 5 days.

(21) Appl. No.: 10/127,493

(22) Filed: Apr. 23, 2002

(65) Prior Publication Data

US 2003/0196649 A1 Oct. 23, 2003

(51) Int. Cl.⁷ .............................................. B24B 7/00
(52) U.S. Cl. ...................................... 451/342; 125/15
(58) Field of Search ........................... 125/15; 451/342, 451/546

(56) References Cited

U.S. PATENT DOCUMENTS

| | | | |
|---|---|---|---|
| 1,700,331 A | * 1/1929 | Perks | 451/342 |
| 1,756,259 A | * 4/1930 | Perks | 451/342 |
| 1,888,895 A | * 11/1932 | Verkuil | 125/13.01 |
| 2,562,327 A | * 7/1951 | Moore | 451/342 |
| 3,566,547 A | * 3/1971 | Lonaberger et al. | 451/342 |
| 4,236,356 A | 12/1980 | Ward | |
| 4,393,626 A | * 7/1983 | Schroer | 451/342 |
| 4,769,201 A | 9/1988 | Chiuminatta et al. | |
| 4,870,946 A | * 10/1989 | Long et al. | 125/13.01 |
| 5,167,215 A | 12/1992 | Harding, Jr. | |
| 5,381,780 A | 1/1995 | Yelton et al. | |
| 5,537,987 A | * 7/1996 | Okawauchi | 125/15 |
| 5,570,677 A | 11/1996 | Chiuminatta et al. | |
| 5,575,271 A | 11/1996 | Chiuminatta et al. | |
| 5,666,939 A | 9/1997 | Chiuminatta et al. | |
| 5,680,854 A | 10/1997 | Kingsley et al. | |
| 5,941,227 A | 8/1999 | Bearden | |
| 6,112,736 A | 9/2000 | Bearden | |
| 6,340,022 B1 | * 1/2002 | Schroer | 125/13.01 |

FOREIGN PATENT DOCUMENTS

| | | |
|---|---|---|
| DE | 41 33 848 | 4/1993 |
| WO | WO 96/21544 | 7/1996 |

* cited by examiner

Primary Examiner—M. Rachuba
(74) Attorney, Agent, or Firm—Richard C. Litman

(57) ABSTRACT

A stabilizing collar for a concrete saw blade provides a rigid blade structure for smoother cutting operations, particularly in partially cured concrete. A pair of the present collars are secured to the blade shaft on each side of the blade, clamping the blade securely therebetween. Each collar has a slightly recessed central area and a raised toroidal rim therearound. Clamping the blade and collar assembly tightly on the shaft, compresses the recessed areas and clamps the rim portions of the collars tightly against the blade at some distance outward from the shaft, thereby providing a rigid assembly and essentially eliminating lateral vibration and flexing of the blade. This enables an otherwise conventional concrete saw to be used for cutting "green" concrete, i.e., relatively soft concrete which has only partially cured, without risk of spalling and breaking up of the edges of the cut due to blade vibration thereagainst.

12 Claims, 3 Drawing Sheets

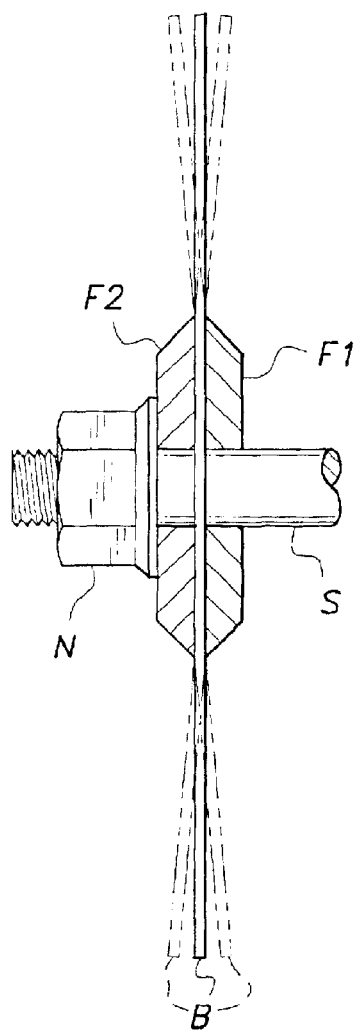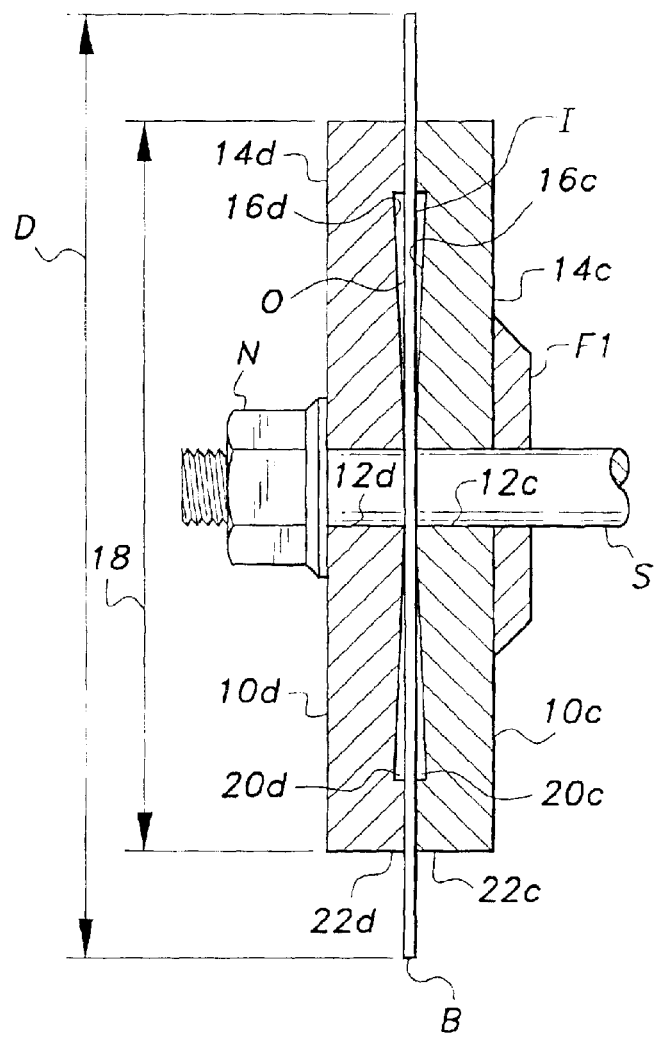
Fig. 2A
PRIOR ART
Fig. 2B

STABILIZING COLLAR FOR A CONCRETE SAW BLADE

BACKGROUND OF THE INVENTION

1. Field of the Invention

The present invention relates generally to power equipment for cutting concrete, and more specifically to a series of collar embodiments for installing on each side or face of the blade of a concrete saw. The present collars serve to stiffen the relatively thin circular blade, thus reducing vibration and lateral flexing of the blade to provide a more true cut and reduce chipping and spalling of the edges of the cut. The present collars enable saws constructed for cutting cured concrete to be utilized for cutting "green" concrete, i.e., concrete which has not completely cured, thus obviating need for an expensive specialty saw for such work.

2. Description of the Related Art

It is universal practice when pouring relatively large slabs of concrete, to provide expansion joints uniformly across the slab to allow the slab to expand and contract laterally without breaking up in an irregular pattern. These expansion joints may be formed by installing separations across the slab form when the concrete is poured, but are generally cut partially through the slab using a circular saw after the concrete has at least partially cured. These regular cuts form stress risers in the slab, and the concrete later cracks in a controlled manner along these expansion joint cuts.

These expansion joint cuts may be made at any time after the concrete sets up sufficiently to maintain its shape. Most concrete contractors prefer to cut the expansion joints when the concrete is still "green," i.e., just after it has set up sufficiently to hold its shape, but before it has fully cured to maximum hardness. This enables the contractor to form the expansion joints very soon after pouring the slab, generally only a matter of a few hours. This often allows the contractor to make the cuts while still at the work site, rather than requiring a second trip to the site at a later date after the concrete has cured. It is clearly much more efficient to cut the expansion joints as soon as possible after pouring the concrete, rather than returning later for such work.

However, cutting such "green" concrete poses problems, perhaps the most critical of which is the lack of support for equipment and workers provided by the relatively soft concrete. Also, "green" concrete in its relatively soft state, is prone to breaking up and spalling along the edges of the freshly sawed cut. Accordingly, specialized saws have been developed for cutting very freshly poured concrete, to overcome the above problems. These "green concrete" or "early entry" saws differ from more conventional saws in that they include a relatively broad, flat support plate with a relatively narrow slot through which the blade disk extends. The span of the plate distributes the weight of the saw over the slab, while the narrow slot results in the plate extending essentially to the edge of the cut and bearing upon the concrete immediately adjacent the cut, to hold it in place while cutting.

The specialized "green concrete" or "early entry" saws are relatively expensive compared to other types of circular saws used for cutting fully cured concrete, and are often relatively limited only for use with "green" concrete. Yet, concrete contractors often find it to be more cost efficient to purchase one or more such expensive saws for "green concrete" work so they can form the expansion joint cuts in a freshly poured slab when it is partially cured, just a few hours after pouring, rather than having to return to the job site a day or more later to make the cuts. This is particularly true of larger concrete contracting companies, which have the finances to purchase the relatively costly "green concrete" saws. Smaller companies often cannot afford to purchase such a specialized concrete saw, and are forced to make an extra trip to the site to saw the expansion joint cuts with a saw for use in hard concrete, after the concrete has cured completely.

The reason that conventional saws used for cutting cured, hard concrete are generally unsuccessful at cutting "green" concrete, is that the circular saw blade extends from its attachment to the shaft as a relatively thin, unsupported disc for most of its diameter. Slight imbalances and/or lack of trueness in the blade attachment, can result in the blade having some slight motion out of the ideal plane of rotation. Furthermore, the relatively thin blade can vibrate laterally due to vibration from the drive train of the saw and/or contacting irregularities in the concrete. The relatively soft, "green" concrete breaks up more easily along the edges of the cut, due to such lateral vibration of the blade.

The present invention provides a solution to the above problem by a series of collar embodiments which are installed in pairs to the blade of a concrete saw, with the blade being sandwiched tightly between the two collars. The collars have diameters on the order of only two inches or so less than the diameter of the blade to which they are attached, and thus limit the unsupported portion of the blade to a relatively narrow toroidal area between the clamps and the blade periphery. This does not limit the utility of the tool, as the typical expansion joint cut is only on the order of about one and one half inches deep. Thus, the two inch peripheral area of the blade when used with the present collars, provides sufficient cutting depth for normal expansion joint cuts, and in fact can also serve as a depth stop to limit the depth of the cut to no more than the difference between the radius of the blade and the radius of the collar.

The present collars comprise several embodiments, differing primarily in their diameters for use with different diameter saw blades. In each case, however, the central portion of each collar has a slight relief area or depression, with a raised clamping area therearound. Securing the collars to each side of the saw blade, results in the central areas of the two collars being forced toward the opposite faces of the blades, with the raised clamping areas of the collars applying a substantial clamping force to the blade therebetween to preclude lateral movement of the blade.

A discussion of the related art of which the present inventor is aware, and its differences and distinctions from the present invention, is provided below.

U.S. Pat. No. 4,236,356 issued on Dec. 2, 1980 to John D. Ward, titled "Cutting Saw And Concrete Groover," describes a small, hand operated saw which may include a series of ganged blades for cutting a series of parallel grooves in concrete. The Ward saw is adapted particularly for use in narrow, confined areas, as in cutting traction grooves in concrete step treads. Ward does not provide any form of clamping collars which subtend a substantial portion of the area of the circular blades and which substantially prevent lateral flexing and vibration of the blades, as provided by the present stabilizing collar invention.

U.S. Pat. No. 4,769,201 issued on Sep. 6, 1988 to Edward Chiuminatta et al., titled "Method Of Cutting Grooves In Concrete With A Soft Concrete Saw," describes a device embodying the basic concept or principle behind a concrete saw adapted for use in cutting "green," or partially cured, concrete. The Chiuminatta et al. saw employs a platform with a skid plate extending therebelow, with the platform and skid plate each having a very narrow slot therein through which the circular blade extends. This greatly reduces the chipping or spalling of the edges of the saw cut, as the skid plate bears downwardly along the very edges of the cut and tends to preclude unstable movement of the material due to blade vibration. However, Chiuminatta et al. do not address the basic cause of such breakup and spalling in the first place, i.e., lateral movement and vibration of the blade out of the ideal plane of rotation. The present stabilizing collars address this problem, and substantially preclude blade vibration.

U.S. Pat. No. 5,167,215 issued on Dec. 1, 1992 to Edward M. Harding, Jr., titled "Dust Removal Apparatus For A Concrete Saw," describes a conventional concrete saw with a dust removal hose and vacuum source for drawing dust laden air from the vicinity of the saw blade. The Harding, Jr. machine with its dust capturing means is clearly directed to cutting fully cured, dry concrete, which is not so prone to breaking up along the edges of the saw cut as is "green" concrete. Accordingly, Harding, Jr. does not provide any means of preventing blade vibration or other means of preventing the edges of the saw cut from chipping or spalling.

U.S. Pat. No. 5,381,780 issued on Jan. 17, 1995 to Darrell A. Yelton et al., titled "Green And Cured Concrete," describes a concrete saw having a cutting guide which bears against the underlying concrete surface to distribute the load of the machine thereon. The Yelton et al. saw is thus similar to the saw of the Chiuminatta et al. '201 U.S. Patent discussed further above, but provides different handle and other structure. In any event, Yelton et al. do not address the issue of lateral vibration of the blade and its damaging effect on cuts made "green" concrete. The blade flanges which clamp the circular blade onto the shaft are relatively small in comparison to the diameter of the blade, as is clearly shown in FIGS. 1 and 2 of the Yelton et al. drawings. No collars having diameters approaching the diameter of the circular blade and clamping the blade therebetween to preclude lateral flexing of the blade, are disclosed by Yelton et al.

U.S. Pat. No. 5,570,677 issued on Nov. 5, 1996 to Edward R. Chiuminatta et al., titled "Method And Apparatus For Cutting Wet Concrete," describes a saw having a spring loaded bearing plate beneath the saw blade. The plate includes a narrow slot therein through which the blade extends, as in the saw of the Chiuminatta et al. '201 U.S. Patent discussed further above. The Chiuminatta et al. '677 U.S. Patent does not provide any relatively large flanges or collars to secure the blade in place. Chiuminatta et al. clearly do not anticipate the need for such in order to reduce blade vibration, as they respond to the problem of imperfect cuts in "green" concrete in a different way, i.e., by providing a bearing plate with a very narrow slot therein for the blade to pass therethrough.

U.S. Pat. No. 5,575,271 issued on Nov. 19, 1996 to Edward R. Chiuminatta et al., titled "Apparatus For Cutting Wet Concrete," describes a saw essentially the same as the saw of the '677 Chiuminatta et al. U.S. Patent discussed immediately above. The '677 and '271 Chiuminatta et al. U.S. Patents are continuations of the same parent patents to the same inventors, and while they each claim somewhat different matter, the devices disclosed in each patent are essentially the same. Accordingly, the discussion of the differences between the machine of the Chiuminatta et al. '677 U.S. Patent and the present invention, is seen to apply here as well.

U.S. Pat. No. 6,666,939 issued on Sep. 16, 1997 to Edward Chiuminatta et al., titled "Soft Concrete Saw," describes essentially the same device as that described in the '201 U.S. Patent to the same patentees and described further above. The '201 U.S. Patent is the parent document for the '939 U.S. Patent, with several intervening generations of issued patents and abandoned applications between the two. While the claims differ between the '939 and '201 Patents, the structures disclosed are essentially the same, and it is felt that the discussion further above of the differences between the device of the '201 U.S. Patent to Chiuminatta et al. and the present invention, applies here as well.

U.S. Pat. No. 5,680,854 issued on Oct. 28, 1997 to Michael G. Kingsley et al., titled "Self Propelled Saw," describes a relatively large and heavy duty saw having a symmetrical axle passing through the blade center, with the blade being driven from both ends of the axle shaft. The Abstract notes provision for vibration isolators with this configuration, but the vibration isolators only apply to the drive system; they do not do anything to dampen lateral vibration and flexing of the relatively large saw blade. In fact, no specific blade attachment is disclosed by Kingsley et al. The only components disclosed in the area of the blade hub, are the blade driveshaft and pulleys at each end thereof. It would appear that the blade as shown in broken lines is somewhat larger than could actually be accommodated by the mechanism, but in any event, no relatively large diameter collars for precluding blade vibration are disclosed by Kingsley et al.

U.S. Pat. No. 5,941,227 issued on Aug. 24, 1999 to Martin A. Bearden, titled "Portable Saw With Disconnectable Platform For Cutting Concrete For Controlling Cracks," describes a relatively small, hand operated saw for cutting "green" concrete. The saw is detachably mounted on a roller platform for moving the saw smoothly over the concrete surface. Bearden is silent regarding any specific blade attachment means for his saw, only noting that the circular blade is attached to a shaft. No relatively large diameter collars for clamping the blade therebetween and eliminating lateral vibration of the blade, are disclosed by Bearden.

U.S. Pat. No. 6,112,736 issued on Sep. 5, 2000 to Martin A. Bearden, titled "Portable Saw With Improved Disconnectable Platform For Cutting Concrete For Controlling Cracks," describes an apparatus closely related to that of the '227 U.S. Patent to the same patentee, discussed above. The same points raised in that discussion are seen to apply here as well.

International Patent Application No. WO 96/21,544 published on Jul. 18, 1996 to Diamant Boart, Inc., titled "Self Propelled Saw," is based upon the same divisional application as the issued '854 U.S. Patent to Kingsley et al., discussed further above, with the assignee of the '854 U.S. Patent being the same entity as the applicant in the '544 International Application. The discussion further above of the differences between the saw of the '854 U.S. Patent and the present invention, is seen to apply here as well.

Finally, German Patent Publication No. 41 33 848 published on Apr. 15, 1993 to Artur Fischer describes (according to the drawings and English abstract) a masonry drill having a pair of stand-off spacers attached thereto. While the abstract states that the spacers serve to dampen vibration, such a drill bit and spacers are not analogous to the saw blade shaft and collars of the present invention. In any event, it is noted that the materials of the spacers of the '848 German Patent Publication are described as a "Kunststoffkappe" and "elastischen Kunststoff . . . Polyurethan," i.e., a plastic cap and an elastomer polyurethane plastic, in column 2, respectively on lines 22–23 and 51 of the text.

Such material is completely unsuitable for use in collars which clamp and compress a saw blade tightly therebetween to preclude lateral movement of the blade from the plane of rotation, as provided by the present collars.

None of the above inventions and patents, taken either singularly or in combination, is seen to describe the instant invention as claimed. Thus a stabilizing collar for a concrete saw blade solving the aforementioned problems is desired.

SUMMARY OF THE INVENTION

The present invention comprises a collar, or more precisely a pair of collars, which secure to the shaft of a concrete saw to each side of the circular blade, to stiffen the relatively thin blade and preclude lateral vibration and movement of the blade during the cutting operation. The collars of the present invention allow an otherwise conventional concrete saw configured for cutting expansion joints in fully cured, dry concrete, to be used for cutting such expansion joints in "green" concrete, i.e., concrete which has only partially cured.

Without the use of the present collars, attempting to cut expansion joints in "green" concrete using a conventional saw, results in spalling and breaking up of the edges of the cut due to lateral vibration of the circular blade in the cut. The relatively soft "green" concrete, does not have the structural strength to resist such blade vibrational forces, and tends to break up and crumble along the edges of the cut as a result.

While specialized saws have been developed for cutting "green" concrete, such saws are relatively expensive and are often specialized to the extent that they cannot be used on fully cured concrete. Thus, the contractor who wishes to be able to work on partially cured concrete, must expend a relatively large amount of money for such a specialized saw with limited use. While the use of such a saw can save time in the field by allowing the contractor to cut expansion joints only hours after the concrete has been poured, rather than having to return some few days later to complete the job, most smaller companies cannot justify the expense of such a specialized piece of equipment for such limited use, and are forced to use a conventional saw to cut the expansion joints in fully cured concrete at a later time, with some risk of initial cracking of the concrete before the expansion joints can be cut.

The present invention provides a means of stiffening the circular saw blade to essentially eliminate lateral vibration and movement of the blade, thereby eliminating the problem of crumbling and spalling of the edges of a cut made in relatively soft, "green" concrete. No special tools or equipment are required, other than a conventional concrete saw equipped with a pair of the present collars on the blade shaft and clamping the blade securely therebetween. The present collars may be formed in a large variety of different diameters and configurations, for adaption to any of a large number of different makes, models, sizes, and power ratings of different concrete saws.

Accordingly, it is a principal object of the invention to provide a rigid stabilizing collar system for the blade of a concrete saw, for reducing or eliminating lateral vibration in the blade during cutting operations and thereby reducing or eliminating spalling and breaking up of the edges of the cut when made in partially cured concrete.

It is another object of the invention to provide such collars which extend substantially over the majority of the blade diameter, with the blade extending beyond the collars for a distance sufficient only to form an expansion joint cut of sufficient depth.

It is a further object of the invention to provide such collars each of which includes a shallow central relief area with a raised toroidal rim therearound, with compression of the relief area resulting in the opposed rim portions clamping the circular blade tightly therebetween to form a rigid assembly.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2A is an elevation view in partial section of a prior art concrete saw blade assembly, illustrating the lateral flexing and vibration problem of such prior art assemblies.

FIG. 2B is an elevation view in partial section of a concrete saw blade assembly with a pair of second embodiment collars secured thereto, showing the resulting rigid assembly.

Similar reference characters denote corresponding features consistently throughout the attached drawings.

DETAILED DESCRIPTION OF THE PREFERRED EMBODIMENTS

The present invention comprises various embodiments of a stabilizing collar for installation to a concrete saw, for greatly reducing or eliminating lateral flexing and vibration of the saw blade during cutting operations. This allows a conventional concrete saw equipped with the present stabilizing collar assembly to be used for cutting expansion joint cuts in "green" concrete, i.e., concrete which has only partially cured and which has not completely hardened. The use of a conventional concrete saw in "green" concrete, results in the spalling and breaking up of the edges of the cut due to lateral flexing and vibration of the blade in the cut as the saw is operated, since the "green" concrete does not yet have the strength to resist such damage. While special saws have been developed for cutting "green" concrete without damage, such saws are relatively costly. The stabilizing collars of the present invention enable a person to use a conventional concrete saw intended for use in cutting fully cured and hardened concrete, to cut expansion joint cuts and the like in "green" concrete without damage to the concrete.

Figure 1:
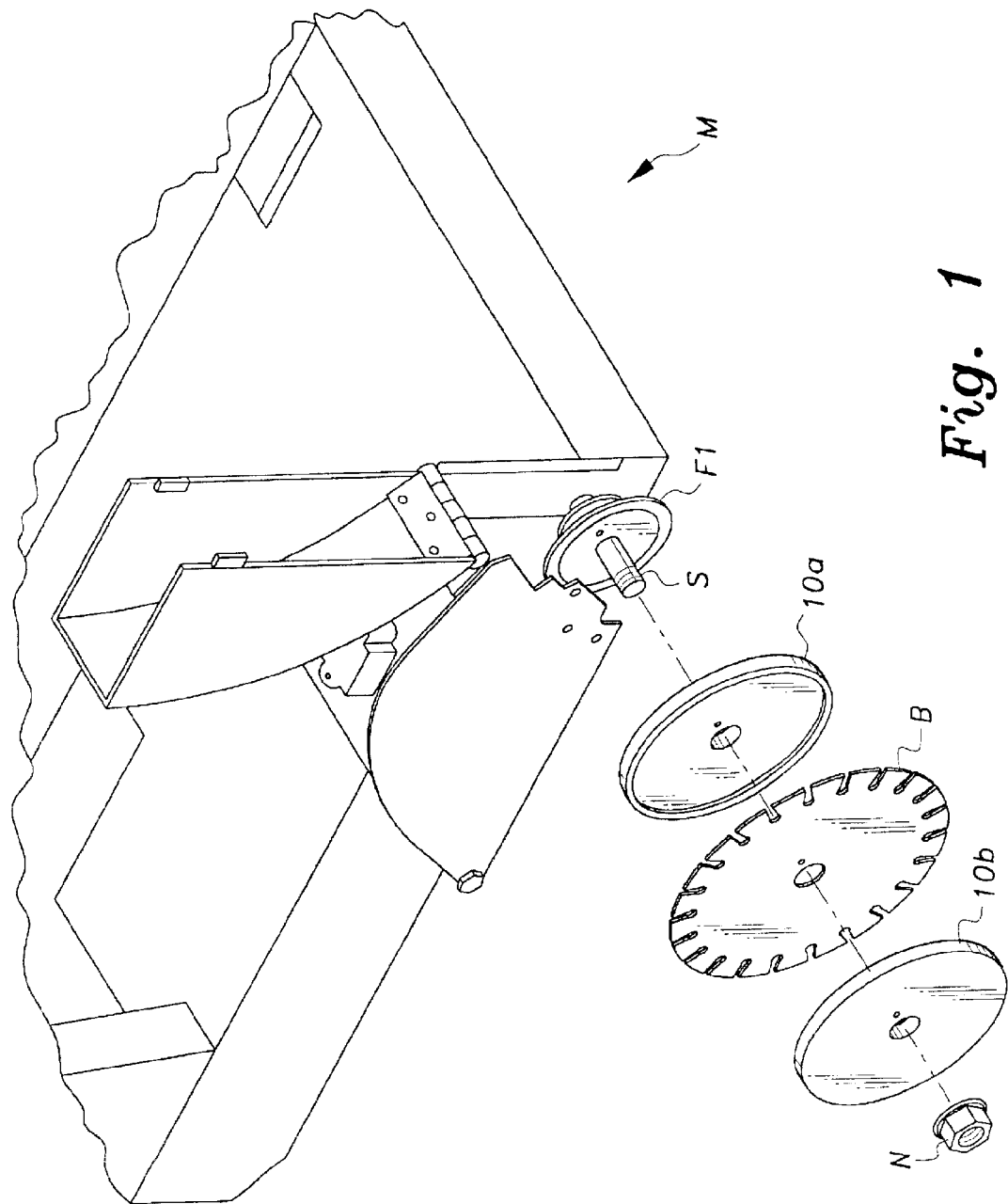
FIG. 1 is an exploded perspective view of a portion of a concrete saw and blade assembly, showing the installation of a pair of first embodiment stabilizing collars thereon.

FIG. 1 of the drawings provides an exploded perspective view of the base of an exemplary concrete saw machine M, showing the installation of a pair of collars of the present invention thereto. The conventional saw M includes a threaded blade mounting shaft S having a backing flange F1 installed thereon, with a mating nut N being used to secure a saw blade B to the shaft S. This structure is conventional, and may be similar to the saws of the disclosures of the '215 and '780 U.S. Patents, respectively to Harding, Jr. and Yelton et al., discussed in the Description of the Related Art further above and incorporated herein by reference. It is conventional in such saws to use a pair of opposed flanges, with one flange installed to each side or face of the blade.

However, the present stabilizing collars obviate the need for a second, outboard flange, as the collars themselves serve as flanges.

The present stabilizing collars are installed generally as shown in FIG. 1. After removing the shaft nut N, the outer flange (not shown in FIG. 1), and the saw blade B, a first stabilizing collar 10a is installed on the shaft S adjacent the backing flange F1. The blade B is then installed on the shaft S, with a second stabilizing collar 10b being placed on the shaft S adjacent the blade B and opposite the first collar 10a, thus sandwiching the blade B between the two collars 10a and 10b. The securing nut N is then secured to the end of the shaft S and tightened, to clamp the blade B tightly between the two collars 10a and 10b. The large diameters of the collars 10a and 10b greatly reduce or eliminate lateral flexing and vibration of the blade B during operation.

FIGS. 2A and 2B provide elevation views in partial section respectively of a prior art blade, flange, and shaft assembly in which no stabilizing collars are used, and a blade, flange, and shaft assembly incorporating the present stabilizing collars. In Prior Art FIG. 2A, a concrete saw blade B is secured to the blade shaft S by a backing flange F1 and a front flange F2, which sandwich and clamp the blade B therebetween. A nut N is used to secure the assembly to the shaft S. It will be noted that the flanges F1 and F2 are of relatively small diameter in comparison to the diameter D of the blade B, and subtend only a small fraction of the blade diameter. This results in the majority of the relatively thin blade B being laterally unsupported.

Due to the power impulses from the drive engine, irregularities in the concrete matrix (e.g. stones, etc.) encountered during cutting, etc., the blade B is subject to a fair amount of lateral flexing and vibration during operation, as indicated by the broken line positions of the blade B in the prior art FIG. 2A. The blade B is relatively free to flex and vibrate across the majority of its diameter, as it has no lateral reinforcement or support beyond the relatively small diameter flanges F1 and F2 at the blade hub. As a result, the flexing of the blade B imparts lateral forces within the saw cut as it is being formed. While this is of no great consequence in fully hardened concrete, it results in spalling and breaking up along the edges of the cut when such cuts are formed in "green" concrete which has not completely hardened and cured.

The present blade stabilizing collars provide a solution to the above noted problem, as shown in FIG. 2B. In FIG. 2B, first and second stabilizing collars 10c and 10d are secured to the shaft S. The two collars 10c and 10d are formed of rigid, circular discs of material (e.g., forged aluminum, although other metals may be used if so desired), and are preferably identical to one another, in order to impart uniform clamping forces to each face of the saw blade B. The first collar disc 10c is installed inboard of the blade B with the shaft S disposed through the concentric blade shaft passage 12c, with its outboard side 14c adjacent the first flange F1 and its opposite blade facing side 16c disposed adjacent the first or inboard face I of the blade B. The second collar disc 10d is installed with the shaft S passing through its shaft passage 12d and with its blade facing side 16d adjacent the second or outboard face O of the blade B, with the securing nut N of the assembly bearing against the outboard side or face 14d of the second disc 10d. No outer flange is required in this assembly, as the second or outer collar disc 10d serves as the flange to clamp the blade B securely when the nut N is tightened.

Concrete saw blades B are generally provided in diameters D from ten to fourteen inches, with larger diameters generally being used on machines having higher power. While larger diameter blades B may provide a longer circumferential blade arc in contact with the concrete being cut at any given moment and/or higher speeds for the cutting edge of the blade for more rapid cutting, the typical expansion joint cut is only about one and one half inches deep. Thus, the majority of the blade diameter does nothing other than to provide structural attachment of the blade cutting edge to the hub.

Accordingly, the present stabilizing collar discs, e.g. discs 10c and 10d, are configured to have diameters 18 which subtend the majority of the blade diameter D, as shown clearly in FIG. 2B. Preferably, the present discs are provided in diameters 18 ranging from six to ten inches. This permits each saw blade diameter to be fitted with stabilizing collar discs having diameters only two inches less than the blade diameter, with the stabilizing collar discs thus supporting the majority of the span or diameter of the saw blade in order to prevent lateral flexing and vibration of the blade. The two inch radius of blade extending beyond the collar discs is sufficient to provide the nominal one and one half inch deep expansion joint cut usually desired.

While each of the stabilizing collar discs of the present invention may be formed with a flat outboard face, i.e. the face which is opposite the saw blade facing side of the disc, the blade facing side is preferably formed with a concentric, shallow indentation or relief thereacross, with a slightly raised peripheral blade clamping rim formed around the outer edge of the relief area. In FIG. 2B, these areas are designated as relief areas 20c and 20d, and raised rim areas 22c and 22d. A flat blade contact surface would result in relatively low blade contact pressures across the discs, particularly at the peripheries thereof, and would permit the discs and blade therebetween to flex slightly, thus defeating the purpose of the present invention.

When the stabilizing collar discs are assembled with the blade B on the shaft S, the nut N is tightened to compress the two facing relief areas of the discs, e.g., relief areas 20c and 20d of the two collar discs 10c and 10d of FIG. 2B, more closely together. (The inboard surfaces of the two discs may or may not be contacting the respective inboard and outboard faces I and O of the saw blade B, as shown in FIG. 2B, depending upon how far down the nut N is turned on the shaft S.) The compression of the central areas of the two discs 10c and 10d together, results in considerably higher clamping pressures being brought to bear along the outer portion of the saw blade B between the opposed raised edges 22c and 22d, and moreover creates a rigid, inflexible assembly at the rims of the two discs 10c and 10d. Due to this preload which is applied to the two discs 10c and 10d, the outboard edges of the discs 10c and 10d cannot flex further outwardly, but rather are compressed inwardly against the opposite faces I and O of the saw blade B to hold it in a rigid, inflexible alignment with its plane of rotation and preclude lateral flexing and vibration.

Figure 3:
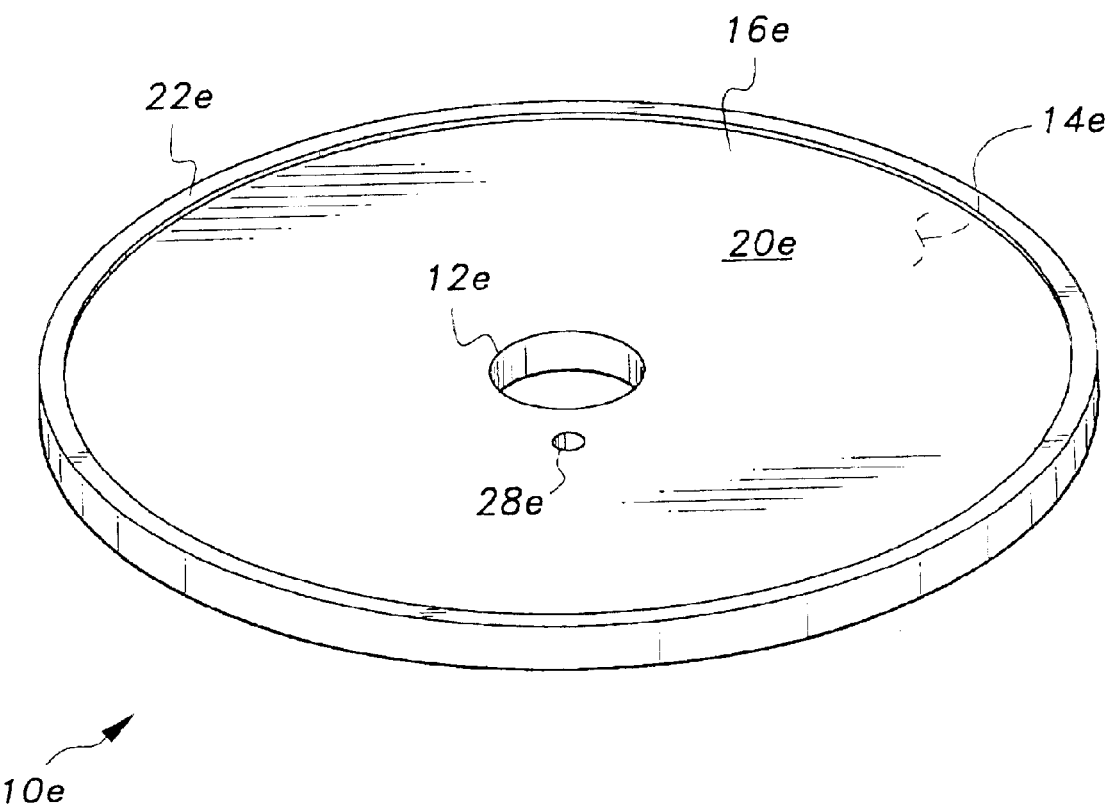
FIG. 3 is a perspective view of a single stabilizing collar similar to the embodiment of FIG. 1 of the present invention, illustrating details thereof.

FIG. 3 of the drawings illustrates yet another embodiment of the present invention, designated as stabilizing collar disc 10e. The disc 10e is similar to the discs 10c and 10d of FIG. 2, with the disc 10e having a central saw blade shaft passage 12e, an outer face 14e (concealed in FIG. 3), an opposite saw blade facing side 16e, a relatively large central area 20e having a slight relief thereto, a raised peripheral rim 22e, and an indexing hole or passage 28e. It will be seen that the disc 10e of FIG. 3 is somewhat thinner than the discs 10c and 10d of FIG. 2B, relative to its diameter. However, the present stabilizing collar invention may be formed in any practicable thickness, diameter, rim width, and/or central relief depth, as desired and according to the requirements of the specific saw and blade with which the collar discs are to be used.

In conclusion, the present stabilizing collar invention provides a much needed, economical means for using a conventional concrete saw configured for cutting completely cured, dry concrete, to cut partially cured, "green" concrete without spalling or breaking up the edges of the cut. The present stabilizing collar is assembled to each side of the blade of an existing concrete saw machine as a mirror image pair of identical disc elements, to clamp the blade therebetween and thus preclude any significant lateral flexing or vibration of the blade during operation.

The peripheral portion of the saw blade extends beyond the collar assembly to provide a cutting edge having sufficient depth to form a conventional expansion joint cut in the concrete. Yet, the clamping of the majority of the diameter of the blade between the two discs of the collar assembly, precludes any appreciable lateral flexing and vibration of the blade, thereby causing the blade to run more true and without hazard of spalling and breaking up of the edges and sides of the cut due to the blade slapping against the sides and edges of the cut due to lateral flexing and vibration during operation.

This advantage will be greatly appreciated by concrete contractors and others, who will no longer be forced to purchase a costly and specialized saw for "green" concrete, or forced to leave the job site and return at a later date to cut the concrete after it has fully cured. The resulting economy of operation in being able to use an existing saw in "green" concrete a matter of hours after it has been poured, will allow contractors to reduce construction costs as well as to enjoy greater profits from their efforts, by reducing the costs otherwise incurred in purchasing costly specialized equipment and/or multiple trips to the job site.

It is to be understood that the present invention is not limited to the embodiments described above, but encompasses any and all embodiments within the scope of the following claims.

I claim:

1. A stabilizing collar for a concrete saw blade having a diameter, comprising:
   a first disc and a second disc, each said first disc and second disc comprising a rigid, circular sheet of material, having a blade facing side, an outboard side opposite said blade facing side, and a blade shaft mounting passage formed concentrically therethrough; and
   a raised peripheral blade clamping rim disposed around the blade facing side of each said first disc and said second disc,
   wherein each said first disc and said second disc defining a diameter subtending a majority of a diameter of a saw blade upon clamping the saw blade between the blade facing sides and the blade clamping rims of said first disc and said second disc;
   wherein said raised peripheral blade clamping rim of each said first disc and said second disc defining a recess disposed concentrically across each said blade facing side of each said first disc and said second disc; and
   wherein the saw blade is held by each said raised rim and substantially by a compression of each said first disc and said second disc to force each said blade facing side into contact with the sawblade about said blade shaft mounting passage.

2. The stabilizing collar according to claim 1, further including an axially offset indexing passage formed through each said first disc and said second disc.

3. The stabilizing collar according to claim 1, wherein each said disc is formed of metal.

4. The stabilizing collar according to claim 3, wherein said metal comprises aluminum.

5. In combination, a concrete saw blade and a stabilizing collar comprising:
   a concrete saw blade having a diameter, a first face, and a second face opposite said first face;
   a first disc and a second disc, each said first disc and second disc comprising a rigid, circular sheet of material, having a blade facing side, an outboard side opposite said blade facing side, and a blade shaft mounting passage formed concentrically therethrough; and
   a raised peripheral blade clamping rim disposed around the blade facing side of each said first disc and said second disc,
   wherein each said first disc and said second disc defining a diameter subtending the majority of said diameter of said saw blade upon clamping said saw blade between the blade facing sides and the blade clamping rims of said first disc and said second;
   wherein said first disc being disposed with said blade facing side thereof adjacent said first face of said saw blade, and said second disc being disposed with said blade facing side thereof adjacent said second face of said saw blades;
   wherein said raised peripheral blade clamping rim of each said first disc and said second disc defining a recess disposed concentrically across each said blade facing side of each said first disc and said second disc; and
   wherein the saw blade is held between said raised rims, and substantially by a compression of each said first disc and said second disc to force each said blade facing side into contact with the sawblade about said blade shaft mounting passage.

6. The saw blade and stabilizing collar combination according to claim 5, further including an axially offset indexing passage formed through each said first disc and said second disc.

7. The saw blade and stabilizing collar combination according to claim 5, wherein each said disc is formed of metal.

8. The saw blade and stabilizing collar combination according to claim 7, wherein said metal comprises aluminum.

9. A concrete saw and a stabilizing collar combination comprising a concrete saw including a blade mounting shaft;
   a first disc, formed of a circular sheet of rigid material defining a centrically disposed shaft mounting passage therethrough, having an out board side and a blade facing side removably mounted on said shaft;
   a concrete saw blade, having a diameter, removably secured to said shaft, having a first face and a second face, said first face adjacent said blade facing side of said first disc;
   a second disc, formed of a circular sheet of rigid material defining centrically disposed shaft mounting passage therethrough, having an out board side and a blade facing side removably mounted on said shaft, said blade facing side of said second disc adjacent said second face of said saw blade;
   a securing nut removably secured to said shaft for sequentially securing said first disc, said saw blade, and said second disc, to said shaft; and a raised peripheral blade clamping rim disposed around the blade facing side of each said first disc and said second disc defining a shallow recess disposed concentrically across said blade facing side of each said first disc and said second disc;

wherein each said first disc and said second disc having a diameter subtending the majority of said diameter of said saw blade; and said first disc disposed with said blade facing side thereof adjacent said first face of said saw blade, and said second disc disposed with said blade facing side thereof adjacent said second face of said saw blade, and said blade clamping rim of said first disc engaging said first face of said saw blade, and said blade clamping rim of said second disc engaging said second face of said saw blade; wherein each said raised peripheral blade clamping rim of each said first disc and said second disc act cooperatively in rigidly clamping said saw blade therebetween, and each facing side of said first disc and said second disc contacting said saw blade about said blade shaft mounting passage upon compression by said securing nut.

10. The concrete saw and stabilizing collar combination according to claim 9, further including an axially offset indexing passage formed through each said first disc and said second disc.

11. The concrete saw and stabilizing collar combination according to claim 9, wherein each said disc is formed of metal.

12. The concrete saw and stabilizing collar combination according to claim 11, wherein said metal comprises aluminum.

* * * * *